United States Patent
Ahn et al.

(10) Patent No.: US 6,842,199 B2
(45) Date of Patent: Jan. 11, 2005

(54) ARRAY SUBSTRATE FOR LIQUID CRYSTAL DISPLAY DEVICE AND THE FABRICATION METHOD OF THE SAME

(75) Inventors: Byung-chul Ahn, Kyoungsangbuk-do (KR); Soon-sung Yoo, Kyoungsangbuk-do (KR); Yong-wan Kim, Kyoungsangnam-do (KR); Keuk-sang Kwon, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/459,456

(22) Filed: Jun. 12, 2003

(65) Prior Publication Data

US 2003/0214613 A1 Nov. 20, 2003

Related U.S. Application Data

(62) Division of application No. 09/695,294, filed on Oct. 25, 2001, now Pat. No. 6,600,546.

(30) Foreign Application Priority Data

Oct. 25, 1999 (KR) .................................. 1999-0046346

(51) Int. Cl.[7] ........................................... G02F 1/1343
(52) U.S. Cl. ............................. 349/38; 438/30; 257/30
(58) Field of Search ........................... 349/38; 438/30; 257/30

(56) References Cited

U.S. PATENT DOCUMENTS

| | | | |
|---|---|---|---|
| 5,686,976 A | 11/1997 | Nishikawa | |
| 5,796,449 A | 8/1998 | Song | |
| 6,043,511 A | * 3/2000 | Kim | ............................ 257/59 |
| 6,172,733 B1 | 1/2001 | Hong et al. | |
| 6,372,560 B1 | 4/2002 | Jen et al. | |
| 6,496,242 B1 | * 12/2002 | Moon | ........................ 349/143 |
| 6,512,243 B1 | * 1/2003 | Kim et al. | ..................... 257/59 |
| 6,537,840 B2 | * 3/2003 | Tseng | .......................... 438/30 |
| 6,678,018 B2 | * 1/2004 | Park et al. | ..................... 349/43 |

* cited by examiner

Primary Examiner—Tarifur R. Chowdhury
Assistant Examiner—P. R. Akkapeddi
(74) Attorney, Agent, or Firm—Birch, Stewart, Kolasch & Birch, LLP (57) ABSTRACT

The present invention discloses an array substrate for an active-matrix LCD device and a method of fabricating the same. The array substrate reduces the number of masks used in the fabrication process so that reliability is enhanced and the cost is reduced over the conventional device and method.

5 Claims, 9 Drawing Sheets

ARRAY SUBSTRATE FOR LIQUID CRYSTAL DISPLAY DEVICE AND THE FABRICATION METHOD OF THE SAME

CROSS REFERENCE

This application is a divisional of application Ser. No. 09/695,294, filed on Oct. 25, 2000, now U.S. Pat. No. 6,600,546 the entire contents of which are hereby incorporated by reference and for which priority is claimed under 35 U.S.C. §120; and this application claims priority of Application No. 1999-0046346 filed in Korea on Oct. 25, 1999 under 35 U.S.C. §119.

BACKGROUND OF THE INVENTION

The present invention relates to an active-matrix liquid crystal display (LCD) device and a method of fabricating the same, and more particularly, to an array substrate having thin film transistors for the active-matrix LCD device and the method of fabricating the array substrate.

An active matrix type LCD device, employing a thin film transistor (TFT) as a switching device, is typically made up of two array substrates with a liquid crystal material interposed therebetween. One substrate, which is the array substrate, has a matrix array of TFTs and pixel electrodes. The opposing substrate, which is the color filter substrate, includes a light-shielding film (also known as the black matrix), a color filter, and a common electrode.

For the array substrate, an inverted staggered type TFT is widely employed because of its simple structure and superior quality. The inverted staggered type TFT is further divided into a back-channel-etch type and an etching-stopper type, which are differentiated according to the methods of forming a channel in the TFT. Between the two, the back-channel-etch type has a simpler structure.

A typical array substrate manufacturing process requires repeated steps of depositing and patterning various layers. The patterning steps involve photolithography masks. Each photolithography step is facilitated using one mask, and the number of masks used in the fabrication process is a critical factor in determining the number of patterning steps. Namely, the production cost depends heavily on the number of masks used in the manufacturing process.

Referring to the attached drawings, a back-channel-etch type structure of an array substrate of an LCD device manufactured by a conventional method will be explained in detail.

Figure 1:
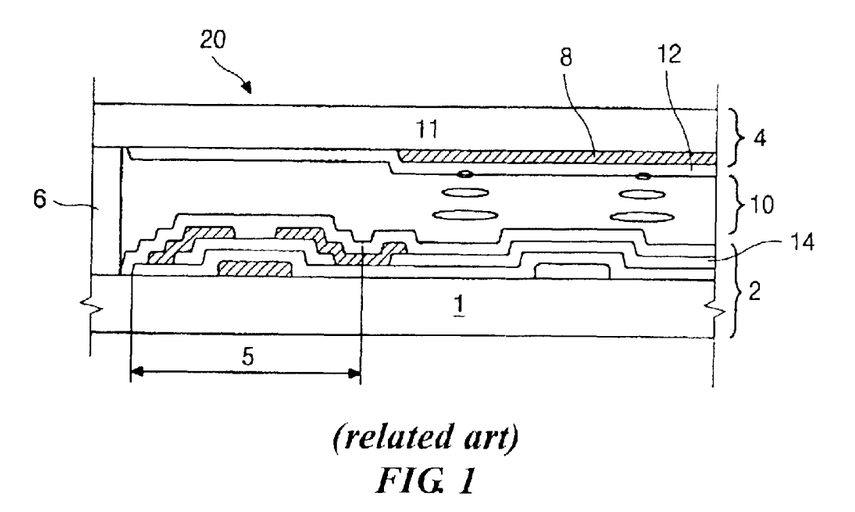
FIG. 1 is a schematic cross-sectional view of a conventional LCD device.

As shown in FIG. 1, the LCD device 20 includes an array substrate 2, a color filter substrate 4 opposing the array substrate 2, a liquid crystal 10 interposed therebetween, and a sealant 6 formed at the periphery of the gap between the two substrates 2 and 4. The sealant 6 prevents the liquid crystal 10 from leaking out of the LCD device 20.

The array substrate 2 includes a substrate 1, a TFT 5, and a pixel electrode 14. The TFT 5 acts as a switching element for changing the orientation of the liquid crystal 10, and the pixel electrode 14 is used as a first electrode to apply electric field to the liquid crystal 10.

The color filter substrate 4 includes a substrate 11, a color filter 8, and a common electrode 12. The color filter 8 is used for displaying colors and the common electrode 12 is used as a second electrode to apply an electric field to the liquid crystal 10.

Figure 2:
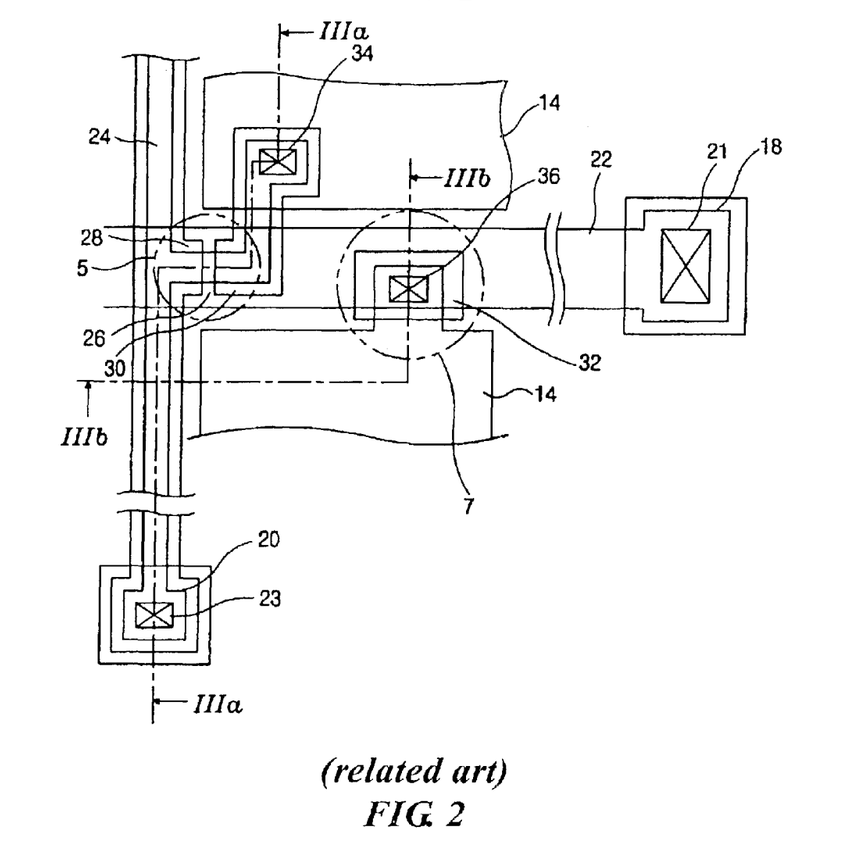
FIG. 2 is a plan view illustrating a portion of an array substrate of the conventional LCD device.

Referring to FIG. 2, a detailed description of the structure and operation of the array substrate 2 will be provided.

On the substrate 1 of the array substrate 2, a gate line 22 is horizontally formed and a data line 24 is formed perpendicular thereto. The pixel electrode 14 is formed within the rectangular area defined by the gate and data lines 22 and 24. Near the crossing point between the gate and data lines 22 and 24, a portion of the gate line 22 is used as a gate electrode 26. Also, at one end of the gate line 22, a gate pad 18 is positioned and the gate pad contact hole 21 is formed in the gate pad 18.

Further, again near the crossing point, the data line 24 is extended to form a source electrode 28, and a drain electrode 30 is formed spaced apart from the source electrode 28. Also at one end of the data line 24, a data pad 20 is positioned and the data pad contact hole is formed in the data pad 23.

Spaced apart from the drain electrode 30 and over a portion of the gate line 22, an island-shaped capacitor electrode 32 is formed from the same layer as the data line 24. An extended portion of the pixel electrode 14 overlaps the capacitor electrode 32, and together with the extended portion forms a storage capacitor 7 to store electric charges.

A capacitor contact hole 36 is formed above the capacitor electrode 32 to electrically connect the pixel electrode 14 with the capacitor electrode 32. Another portion of the pixel electrode 14 also overlaps a portion of the drain electrode 30, and a drain contact hole 34 is formed at the overlapped portion to electrically connect the drain electrode 30 and the pixel electrode 14.

As explained previously, the TFT 5, which includes the gate, source, and drain electrodes 26, 28 and 30, functions as a switch for applying electric field to the liquid crystal 10 (shown in FIG. 1). That is to say, in operation, if a signal is applied to the gate electrode 26 of the TFT 5, an electrical connection is established between the data line 24 and the pixel electrode 14. When the gate electrode 26 is turned on, electric field is applied to the pixel electrode 14 according to the signal, from an external circuit (not shown), applied to the data line 24 via the data pad 20.

Next, referring to FIGS. 3A to 7A and 3B to 7B, a more detailed description of the structure and the fabrication method of the TFT and the storage capacitor will be provided. FIGS. 3A to 7A illustrate sequential fabrication steps of a cross-section taken along a line "IIIa—IIIa" of FIG. 2, and FIGS. 3B to 7B illustrate corresponding sequential fabrication steps of a cross-section taken along a line "IIIb—IIIb" of FIG. 2.

Figure 3A:
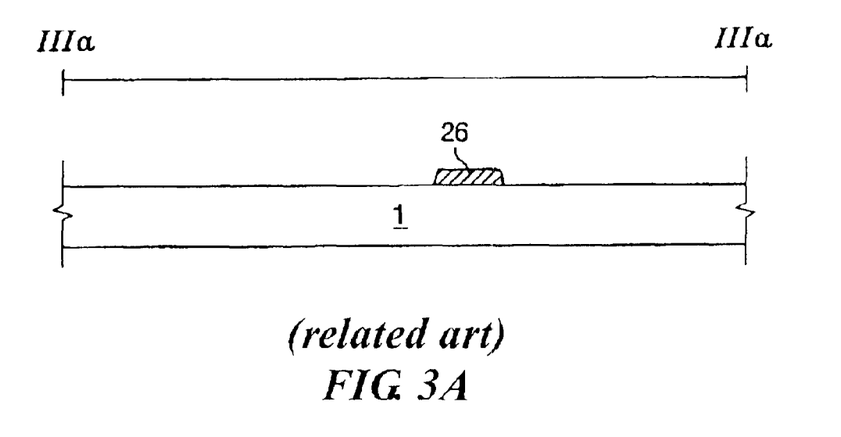
Figure 3B:
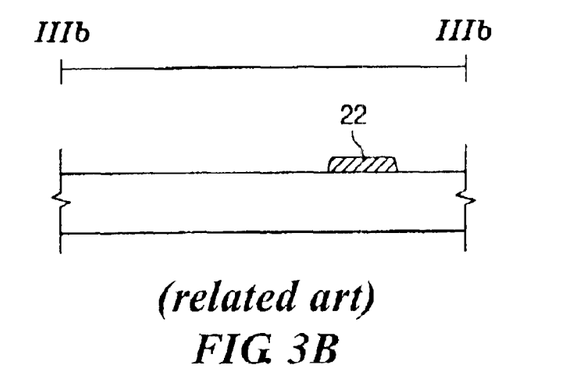

As shown in FIGS. 3A and 3B, a first metallic material is deposited on a surface of the substrate 1 and patterned with a first mask to form the gate line 22 including the gate electrode 26 and gate pad 18 (shown in FIG. 2). For the first metallic material, a highly conductive metal such as aluminum (Al), aluminum alloy, or molybdenum (Mo) is preferred.

Figure 4A:
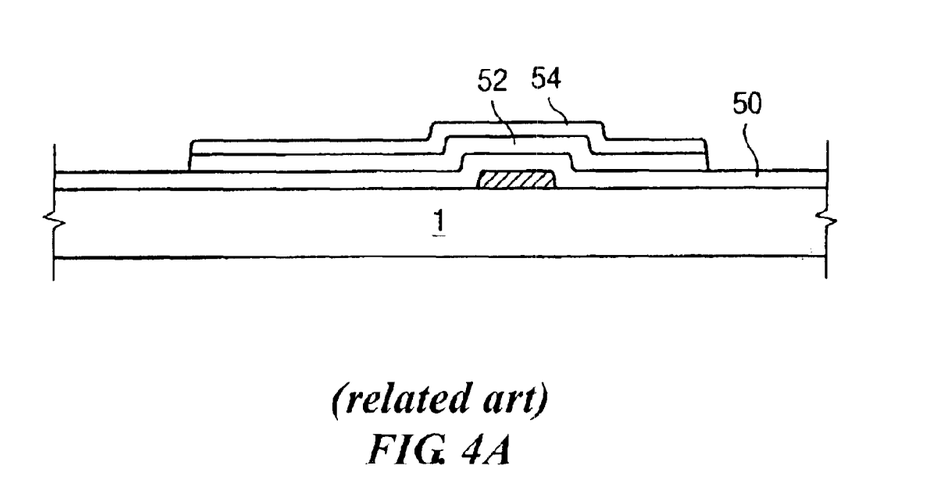
Figure 4B:
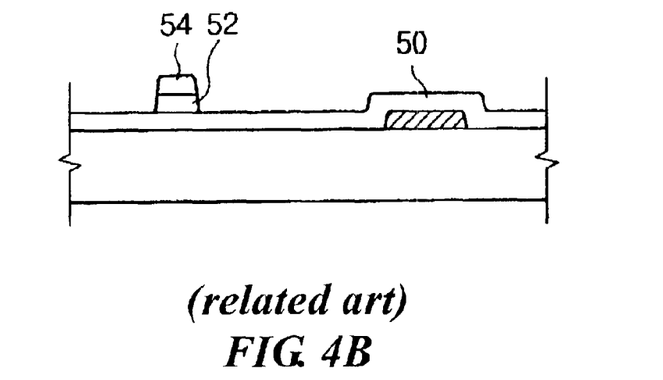

As shown in FIGS. 4A and 4B, a first insulating material is then deposited to form a gate insulating layer 50. On the gate insulating layer 50, a semiconductor material is deposited and doped with impurities and patterned with a second mask to form a semiconductor layer 52 and an ohmic contact layer 54, thereby defining a first intermediate structure.

Figure 5A:
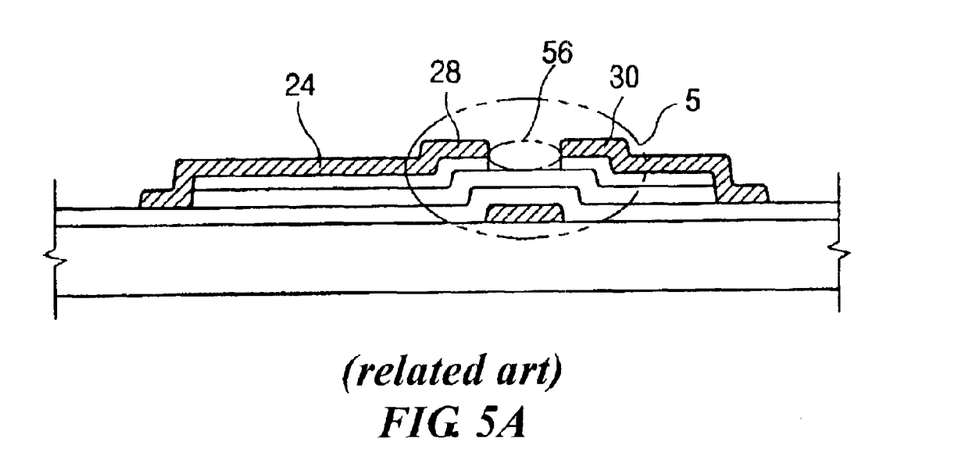
Figure 5B:
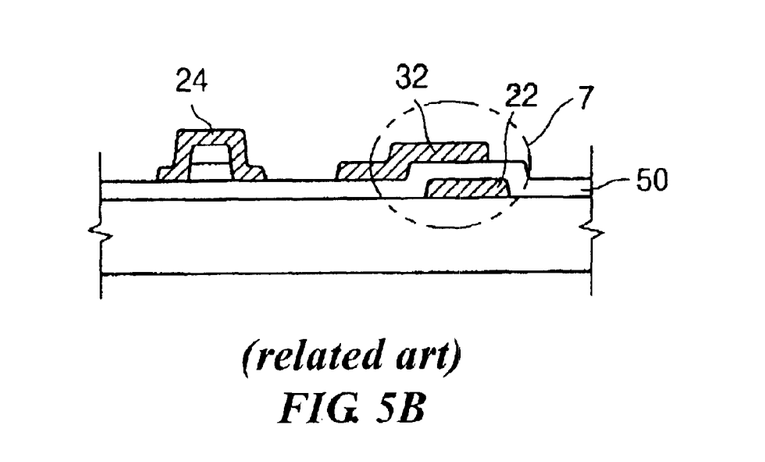

Then, as shown in FIGS. 5A and 5B, a second metallic material is deposited over the first intermediature structure and patterned with a third mask to form the source and drain electrodes 28 and 30 and the data line 24. The data line 24 is connected with the source electrode 28 (FIG. 5A). At the same time, over a portion of the gate line 22, the second metallic material is used to form the capacitor electrode 32 with the third mask (FIG. 5B).

Afterwards, a portion of the ohmic contact layer 54 is also etched away to form a back channel 56 (FIG. 5A). At this point a second intermediate structure is defined, including the TFT 5 that is made up of the gate, source, and drain electrodes 26, 28, and 30, the semiconductor layer 52, the ohmic contact layer 54, and the back channel 56.

Figure 6A:
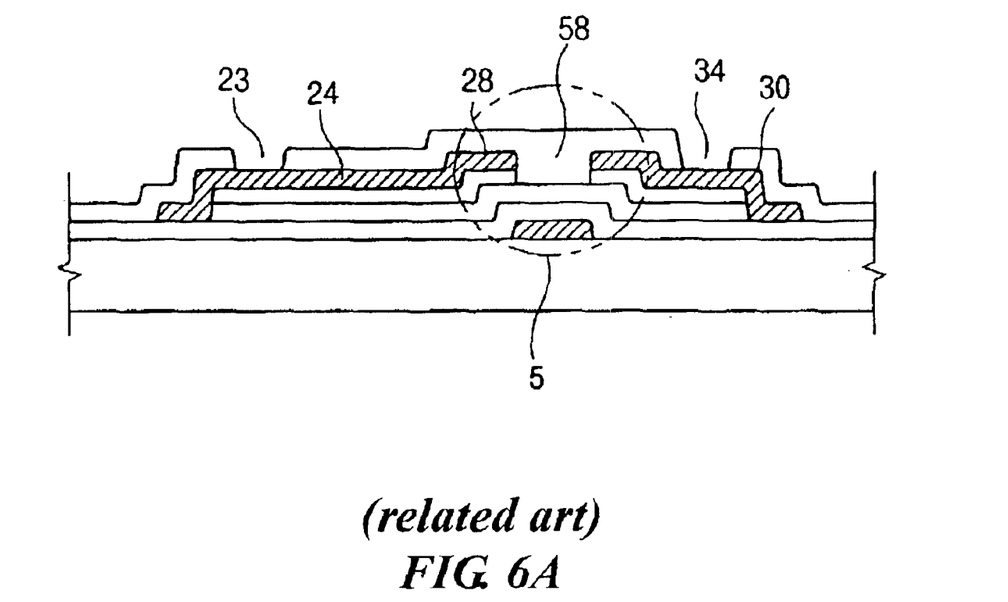
Figure 6B:
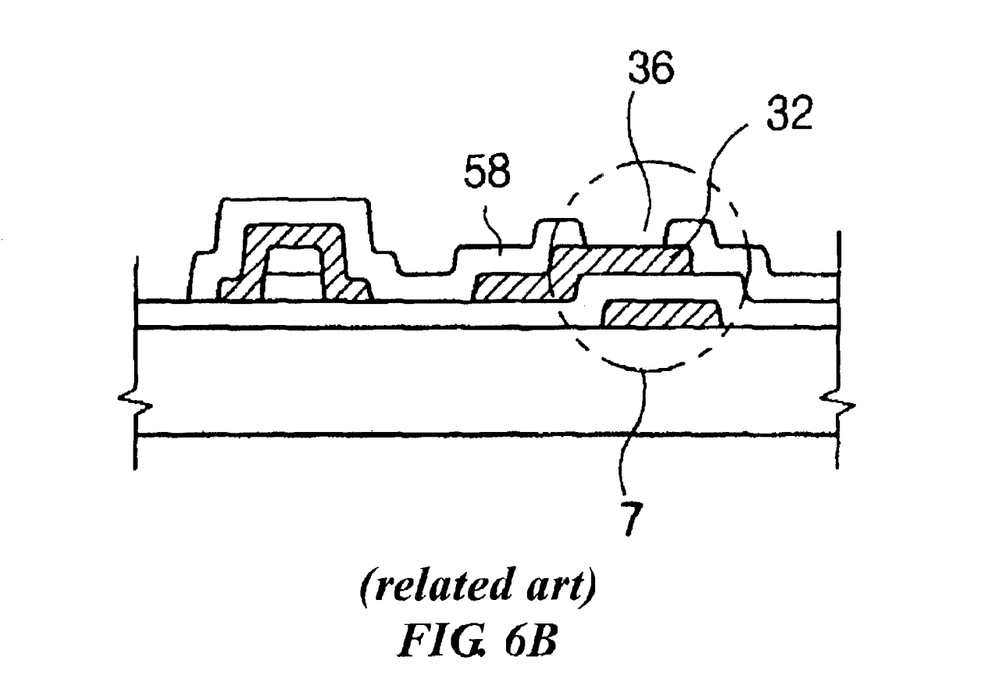

As shown in FIGS. 6A and 6B, over the second intermediate structure, a second insulating material is deposited and patterned with a fourth mask to form a passivation layer 58. The passivation layer 58, protecting the TFT 5 and the capacitor electrode 32, is preferably selected from inorganic-based silicon nitride ($SiN_x$), silicon oxide ($SiO_2$), or organic-based benzocyclobutene (BCB) because they exhibit high light-transmissivity, a moisture-proof quality, and high durability. By patterning the second insulating layer with the fourth mask, the data pad contact, the drain contact, and the capacitor contact holes 23, 34 and 36 are formed, thereby defining a third intermediate structure.

Figure 7A:
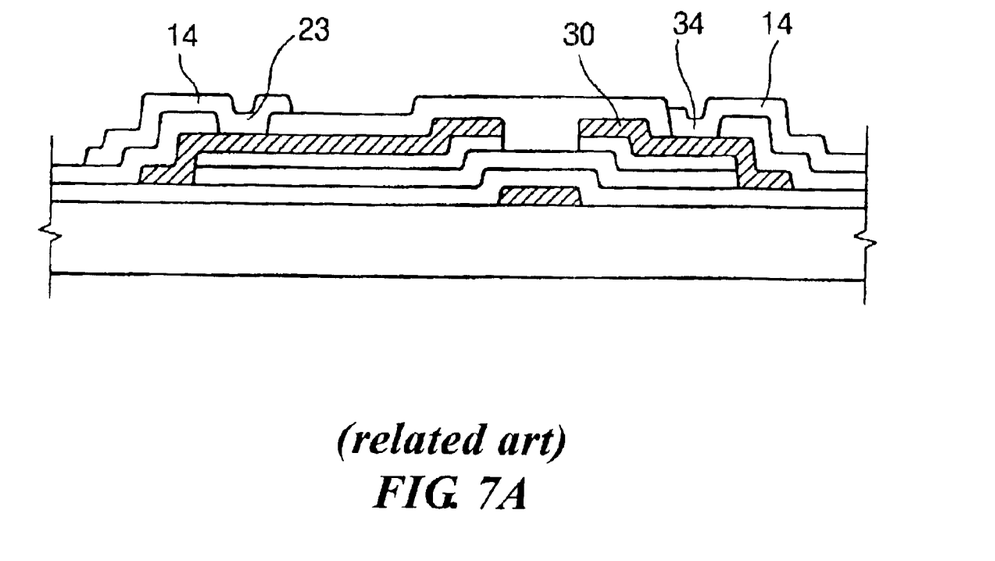
Figure 7B:
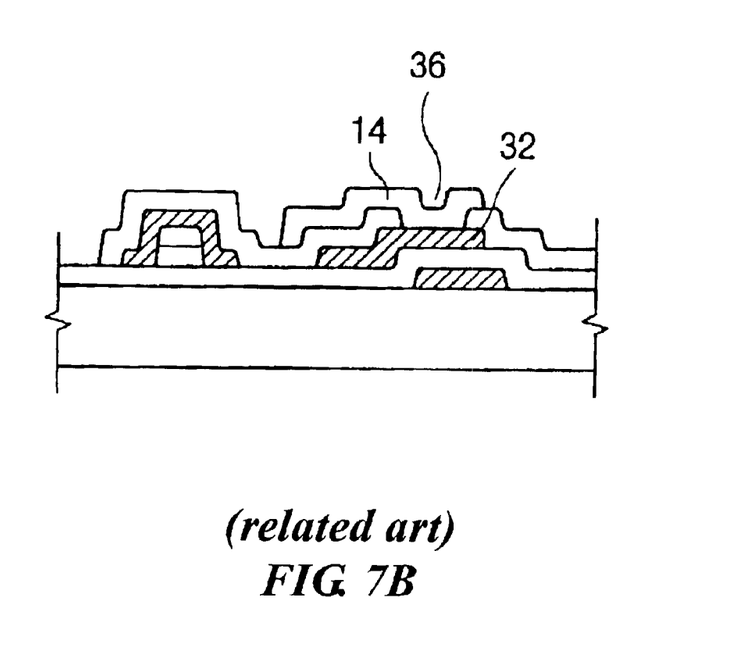

Then as shown in FIGS. 7A and 7B, on the third intermediate structure, a transparent conductive material is deposited and patterned with a fifth mask to form the pixel electrode 14. The pixel electrode 14 is electrically connected with the drain electrode 30 and the capacitor electrode 32 via the drain and capacitor contact holes 34 and 36, respectively. The transparent conductive material is preferably made of indium tin oxide (ITO).

Figure 8:
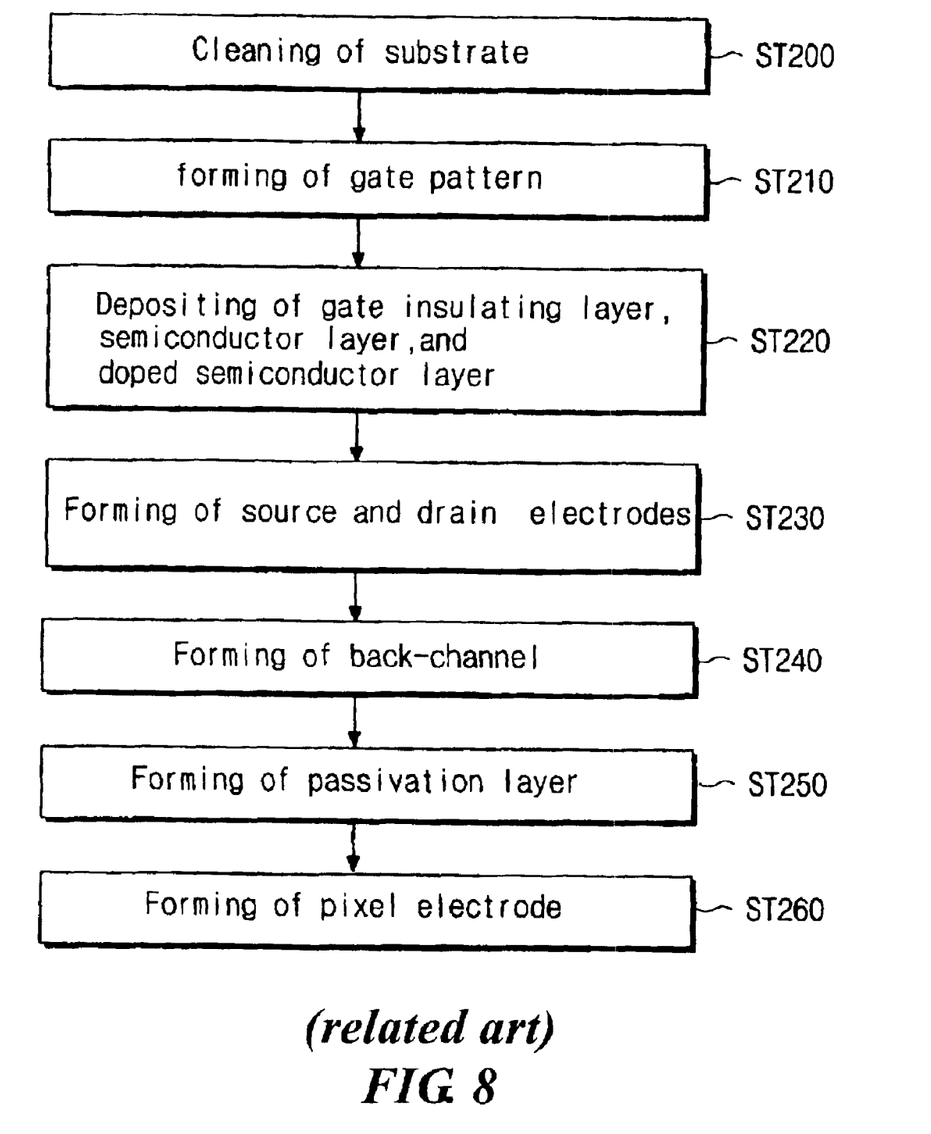
FIG. 8 is a block diagram illustrating the sequence of the conventional fabricating steps of the array substrate.

FIG. 8 shows the above-described fabricating process in a block diagram.

In step ST200, the substrate is cleaned to be free from contaminants on the surface.

In step ST210, the gate line 22, gate electrode 26, and gate pad 18 are formed by depositing the first metallic material and patterning the first metal layer by using the first mask.

In step ST220, the gate insulating layer 50 is formed by depositing the first insulating layer and patterned using the second mask. Then the semiconductor and ohmic contact layers 52 and 54, respectively, are formed by sequentially depositing the semiconductor materials and doped semiconductor material and patterning the materials.

In step ST230, the source and drain electrodes 28 and 30, the data line 24, and the capacitor electrode 32 are formed by depositing and patterning the second metallic layer using a third mask.

In step ST240, the back channel 56 is formed by etching the ohmic contact layer 54 using the source and drain electrodes as a mask.

In step ST250, the passivation layer 58 and the data, drain, and the capacitor contact holes (23, 34, and 36 respectively) are formed by depositing and patterning the second insulating layer using a fourth mask.

In step ST260, the pixel electrode 14 is formed by depositing and patterning the transparent conductive material using a fifth mask.

The above-described conventional method of fabricating the array substrate of the LCD device employs five masks. If aluminum is used to form the gate electrode, at least two additional masks are needed to prevent hillocks, i.e., so that gate line defects can be avoided. Accordingly, at least five masking steps, and as many as seven steps, are required in the conventional fabricating process of the array substrate.

As mentioned above, a decrease in masking steps would decrease the manufacturing cost and improve the manufacturing yield.

SUMMARY OF THE INVENTION

In view of the foregoing and other problems of the conventional manufacturing method of the LCD device, it is an object of the present invention to provide a relatively low cost manufacturing method of the array substrate for the LCD device.

To achieve the above-mentioned objects, the present invention provides a method of manufacturing an array substrate of a LCD device and an array substrate fabricated by the method. The method includes preparing a substrate; forming a plurality of gate lines, a plurality of gate pads and gate pad contact holes, and a first insulating layer by depositing a first metal layer and a first insulating layer sequentially on a surface of the substrate and patterning the first metal layer and the first insulating layer with a first mask such that the plurality of gate lines are parallel with and spaced apart from each other wherein each gate pad is positioned at one end of a corresponding gate line, and wherein each gate pad contact hole has a shape of a through hole passing through the gate pad and the first insulating layer; forming a second insulating layer, a semiconductor layer, an ohmic contact layer, and a second metal layer by depositing a second insulating material, a semiconductor material, a doped semiconductor layer, and a second metallic material sequentially over the surface of the substrate; forming a plurality of data lines, data pads, source electrodes, drain electrodes, and drain contact holes by patterning the second metal layer with a second mask wherein the data lines cross the gate lines, each data pad is positioned at one end of a corresponding data line, each source electrode is extended from the data lines near the crossing point of the gate line and the data line, the drain electrode is spaced apart from the source electrode, and wherein the drain contact hole is positioned on the drain electrode; forming a plurality of back-channels by etching away portions of the ohmic contact layer using the patterned second metal layer as a mask, wherein the channel is positioned between the source and the drain electrodes; depositing a third insulating layer on the data lines, the source and the drain electrodes, and the data pads; patterning the third insulating layer, the ohmic contact layer, the semiconductor layer and second insulating layer with a third mask to form a passivation layer, wherein the passivation layer has a data pad contact hole having a shape of a through hole positioned over the data pad, and wherein the passivation layer covers the patterned second metal layer and a peripheral portion of the gate line; and forming a plurality of pixel electrodes, data pad electrodes, and gate pad electrodes by depositing a transparent conductive layer on the passivation layer, and patterning the transparent conductive layer by a fourth mask, wherein a portion of the pixel electrode overlaps the peripheral portion of the gate line, the pixel electrode is electrically connected with the drain electrode via the drain contact hole, the data pad electrode is electrically connected with the data pad by way of the data pad contact hole, and wherein the gate pad electrode is electrically connected with the gate pad via the gate pad contact hole.

Another method includes steps of depositing a first conducting material and a first insulating material on top of the first conducting material on a substrate; using a first mask, forming a gate line, a gate pad at one end the gate line, a first insulating layer over the gate line and gate pad, and at least one gate pad contact hole the gate pad; depositing, in sequence, a second insulating layer, a semiconductor layer, an ohmic contact layer, and a second conducting material over the resulting structure; using a second mask to pattern the second conducting material, forming a data line such that the data line cross the gate line and forming source and drain electrodes the crossing point; forming a back channel between the source and drain electrodes by etching the ohmic contact layer using the source and drain electrodes as a mask; forming a passivation layer by depositing a third insulating layer over the resulting structure; using a third mask, removing the second insulating layer, the semiconductor layer, the ohmic contact layer, and the passivation layer over a portion of the gate line and the gate pad; depositing a transparent conductive material over the resulting structure; and using a fourth mask, forming a pixel electrode such that the pixel electrode is electrically connected to the source and drain electrodes, the gate pad, and the data pad.

Further, an embodiment of an array substrate for an active matrix type liquid crystal display device includes a substrate; a gate line above on substrate; a gate pad at one end of the gate line such that a gate pad contact hole is formed to expose the substrate; a first insulating layer on the gate line; a data line over the first insulating layer to form a crossing point between the gate and data lines and the data line extending into a direction of the gate line to form a source electrode, and wherein a data pad is formed at one end of the data line; a drain electrode formed space apart from the source electrode over the gate line, the drain electrode also extending into a rectangular region defined by the gate and data lines; and a pixel electrode formed over the structure to be electrically connected to the source and drain electrodes, gate pad, and data pad, and wherein the pixel electrode is extended over a portion of the gate line as a capacitor electrode of a storage capacitor such that the storage capacitor includes the portion of the gate line, the extended portion of the pixel electrode, and the first insulating layer disposed inbetween.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which:

FIGS. 3A to 7A illustrate a cross-sectional view of conventional sequential fabricating steps along the line "IIIa—IIIa" of FIG. 2;

FIGS. 3B to 7B are illustrate a cross-sectional view of corresponding conventional sequential fabricating steps along the line "IIIb—IIIb" of FIG. 2;

DETAILED DESCRIPTION OF PREFFERED EMBODIMENTS

Figure 9:
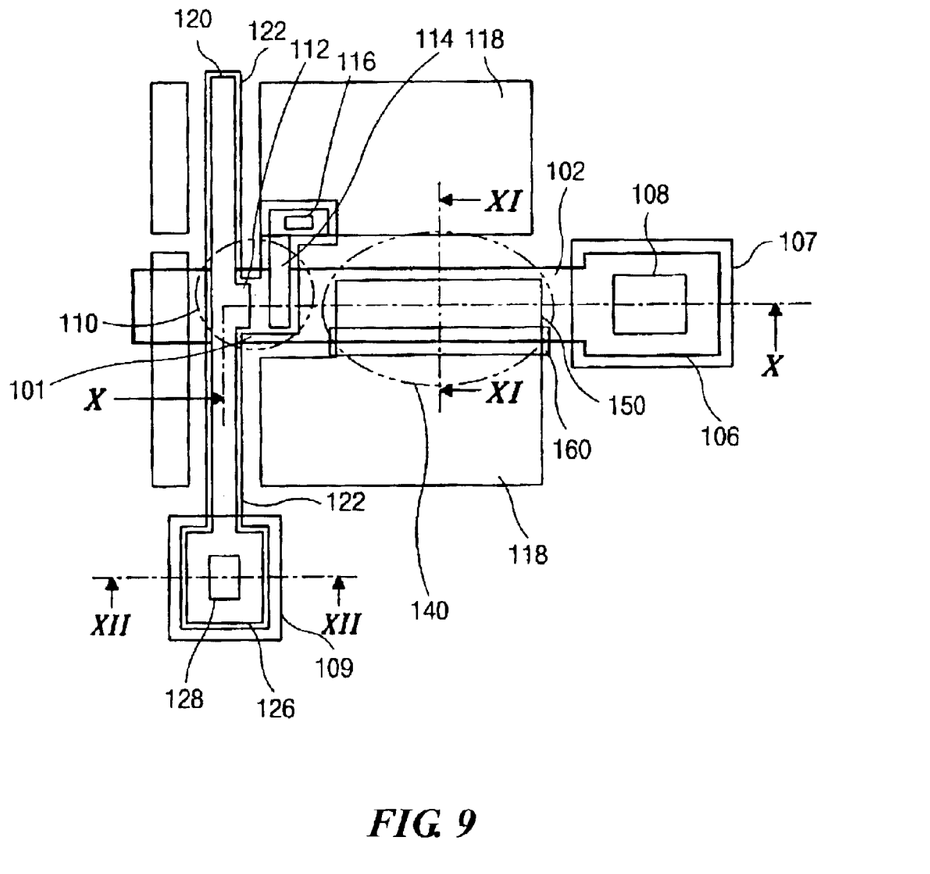
FIG. 9 is a plan view illustrating an array substrate according to a preferred embodiment of the present invention.

Referring now to the drawings, and more particularly to FIG. 9, an array substrate according to a preferred embodiment of the present invention is described.

A gate line 102, including a gate pad 106 at one end, is arranged in one direction, and a data line 120, including a data pad 126 at one end, is arranged perpendicular to the gate line 102. Gate and data pad electrodes 107 and 109 are positioned over the gate and data pads 106 and 126, respectively. Pixel electrode 118 is positioned in the rectangular area defined by the gate and data lines 102 and 120.

Over the gate and data pads 106 and 126, a gate electrode contact hole 108 and a data electrode contact hole 128 are positioned, respectively. The gate pad electrode 107 is electrically connected with the gate pad 106 via the gate pad contact hole 108, and the data pad electrode 109 is electrically connected with the data pad 126 via the data pad contact hole 128.

Near the crossing point between the gate and data lines 102 and 120, a source electrode 112 is protruded from the data line 120. Spaced apart from the source electrode 112, a drain electrode 114 is positioned. Overlapped by the source and drain electrodes 112 and 114, a portion of the gate line 102 is used as a gate electrode 101. The gate, source, and drain electrodes 101, 112, and 114 make up a thin film transistor (TFT) 110.

Over the drain electrode 114, a drain contact hole 116 is positioned. The pixel electrode 118 is electrically connected with the drain electrode 114 via the drain contact hole 116.

Spaced apart from the drain electrode 114, a portion of the pixel electrode 118 is extended to form a capacitor electrode 150. The capacitor electrode 150 overlaps a portion of the gate line 102. Between the capacitor electrode 150 and the gate line 102, a short-preventing portion 160 is positioned to prevent short circuits from occurring therebetween. The capacitor electrode 150 and the overlapped portion of the gate line 102 make up a storage capacitor 140.

Further, a passivation layer 122 covers the data line 120, and the source and drain electrodes 112 and 114.

Hereinafter, with references to FIGS. 10A to 10D, the fabricating process of the array substrate according to a preferred embodiment of the present invention will be explained in detail.

Figure 10A:
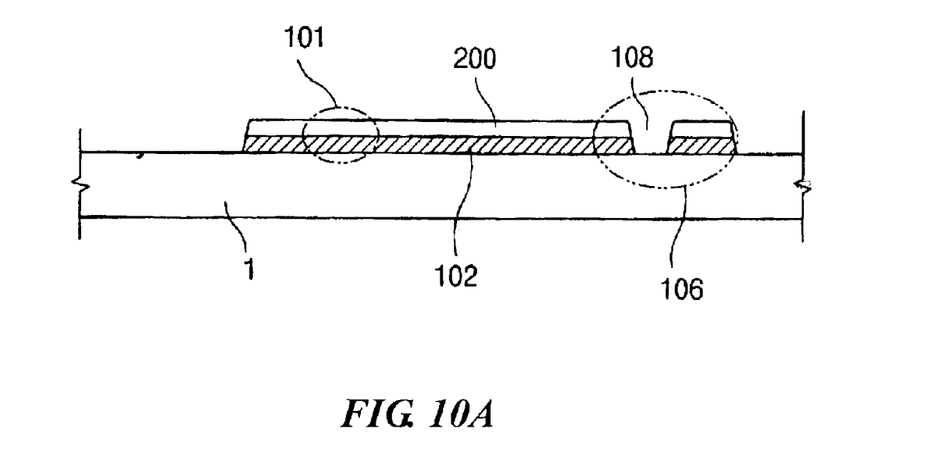
FIGS. 10A to 10D illustrate a sequence of cross-sectional views taken along a line "X—X" of FIG. 9, corresponding to the sequence of fabricating steps according to the invention.

As shown in FIG. 10A, on a surface of a substrate 1, a first metallic material and a first insulating material are deposited sequentially, and both are patterned with a first mask to form the gate line 102 and a first insulating layer 200. A portion of the gate line 102 is used as the gate electrode 101. The first metallic material can include molybdenum (Mo), Chromium (Cr), and/or aluminum-neodymium-molybdenum alloy.

Further, at one end of the gate line 102, the gate pad contact hole 108 is formed in the gate pad 106, thereby defining a fourth intermediate structure. The gate pad contact hole 108 makes possible interconnection between the gate pad 106 and the pixel electrode 118 (shown in FIG. 10d). Multiple smaller gate pad contact holes (not depicted) are preferred over one equivalently large gate pad contact hole to decrease the contact resistance between the pixel electrode 118 and the gate pad 106.

Figure 10B:
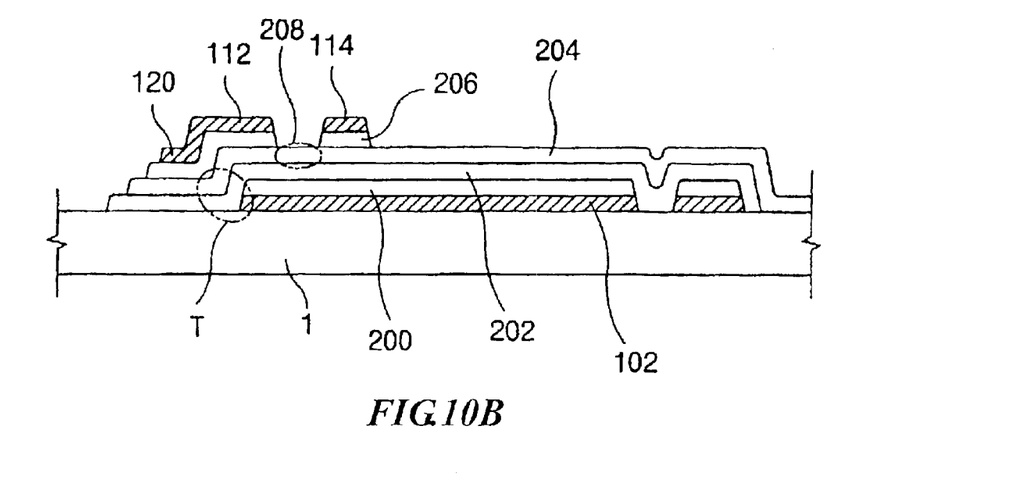

Next, as shown in FIG. 10B, on the fourth intermediate structure, a second insulating material, a semiconductor material, a doped semiconductor material, and a second metallic material are deposited sequentially to form the second insulating layer 202, the semiconductor layer 204, the ohmic contact layer 206, and the second metal layer. The second metal layer is patterned with a second mask so as to form the source and drain electrodes 112 and 114, the data line 120.

Afterwards, the ohmic contact layer 206 is etched, using the second patterned metal layer as a mask, to form a back channel 208 and decrease leakage current, thereby defining a fifth intermediate structure. Also, the second insulating layer 202 prevents short circuits at a stepped portion "T" between the gate line 102 and the data line 120.

Figure 10C:
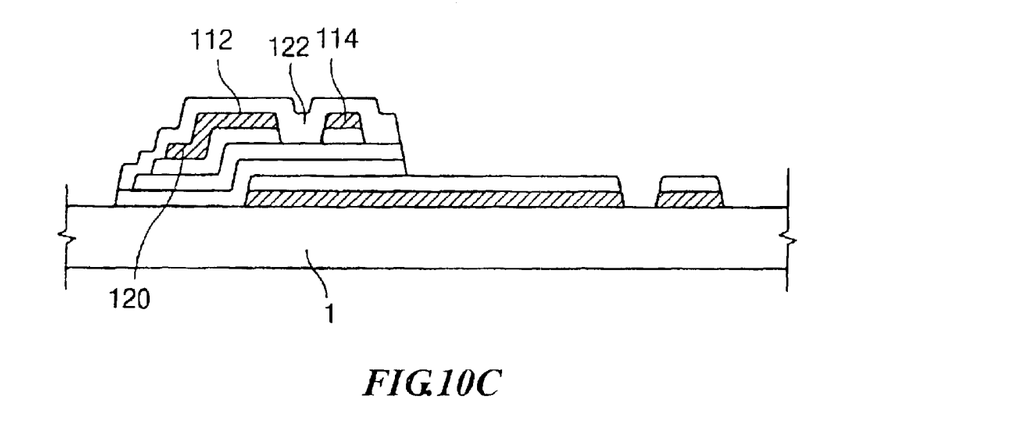

Next, as shown in FIG. 10C, over the surface of the fifth intermediate structure, a third insulating material is deposited and patterned with a third mask to form the passivation layer 122. When patterned with the third mask, the overall portions of the ohmic contact layer 206, the semiconductor layer 204, and the second insulating 202, except for portions under the third mask, are etched away, thereby defining a sixth intermediate structure. At this point, the first insulating layer 200 remains and protects the gate line 102 and the gate pad 106. The third mask covers the patterned second metal layer and a peripheral portion of the gate line 102, which will be overlapped with a pixel electrode 118 (see FIG. 11). The passivation layer 122 also includes the data pad contact hole 128 (see FIG. 12).

Figure 10D:
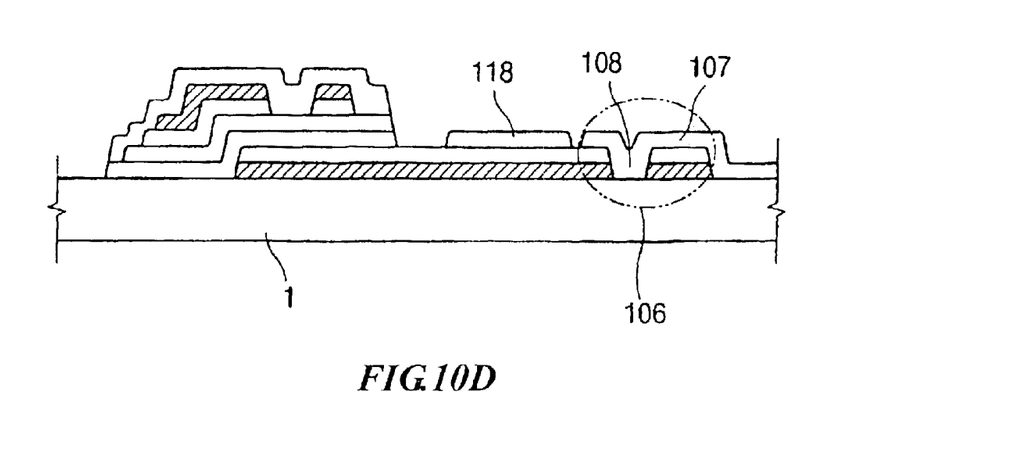

Finally, as shown in FIG. 10D, over the surface of the sixth intermediate structure, a transparent conductive material is deposited and patterned with a fourth mask to form the pixel electrode 118. At this point, over the gate pad 106, the gate pad electrode 107 contacting the gate pad 106 via the gate pad contact hole 108 is also formed of the same material. The transparent conductive material is preferably indium tin oxide (ITO) or indium zinc oxide (IZO).

Figure 11:
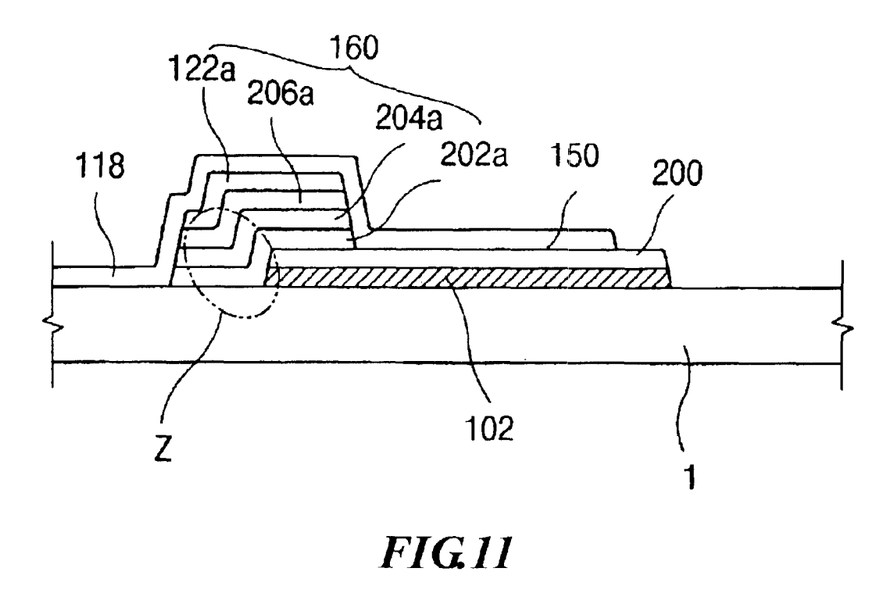
FIG. 11 is a cross-sectional view taken along the line "XI—XI" of FIG. 9.

Now, referring to FIG. 11, the structure of the storage capacitor 140 (shown in FIG. 9) will be explained. After the passivation layer 122 is formed using the third mask, portions of the ohmic contact layer 206, the semiconductor layer 204, and the second insulating 202 over the gate line are etched away except for the short-preventing region 160. As mentioned above, the first insulating layer 200 remains to protect the gate line 102.

Then, after the transparent conductive material is deposited and patterned with the fourth mask, the capacitor electrode 150 is formed. The capacitor electrode 150 extends from the pixel electrode 118 and overlaps a portion of the gate line 102. The first insulating layer 200 is interposed therebetween. The capacitor electrode 150 and the overlapped portion of the gate line 102 and the first insulating layer 200 interposed therebetween make up the storage capacitor 140.

The short-preventing portion 160 is positioned at the stepped portion "Z" between the stepped end of the gate line 102 and the step of the capacitor electrode 150 to prevent short circuits from occurring between the capacitor electrode 150 and the gate line 102. Portions 122a, 202a, 204a and 206a of the passivation layer, the second insulating layer, the semiconductor layer, and the ohmic contact layer 122, 202, 204, and 206 make up the short-preventing portion 160.

Figure 12:
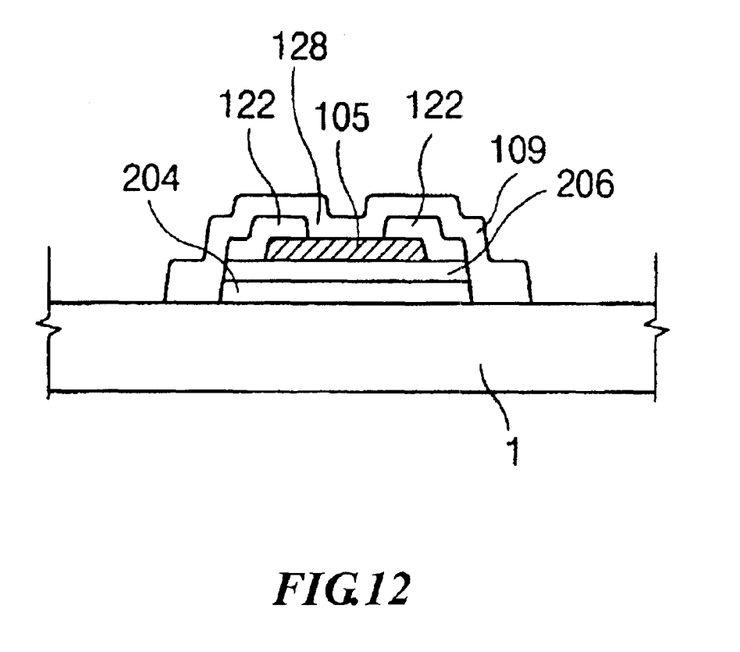
FIG. 12 is a cross-sectional view taken along the line "XII—XII" of FIG. 9.

Referring to FIG. 12, the structure of the data pad according to the preferred embodiment of the present invention will be explained. After the second metal layer is patterned with a second mask, the data pad 126 is formed in addition to the source electrode 112, the drain electrode 114, and the data line 120. Also, the semiconductor layer 204 and the ohmic contact layer 206 are formed. Afterwards, when the passivation layer 122 is formed using the third mask, the data pad contact hole 128 is also formed.

Then, after the transparent conductive material is deposited and patterned with the fourth mask, the data pad electrode 109 is formed. The data pad electrode 109 is made of the same material as the pixel electrode 118 (shown in FIGS. 9 and 11), and covers the passivation layer 122 and the data pad 126. The data pad contact hole 128 interconnects the data pad 126 and the data pad electrode 109.

As described above, the fabricating method according to the preferred embodiment of the present invention employs only four masks, and therefore provides a less expensive and more reliable method of manufacturing an active-matrix LCD device.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. An array substrate for an active matrix type liquid crystal display (LCD) device, said device comprising:
    a substrate;
    a gate line above the substrate;
    a gate pad at one end of said gate line such that a gate pad contact hole is formed to expose said substrate;
    a first insulating layer on said gate line;
    a data line over said first insulating layer to form a crossing point between said gate and data lines and said data line extending into a direction of said gate line to form a source electrode, and wherein a data pad is formed at one end of said data line;
    a drain electrode formed space apart from said source electrode over said gate line, said drain electrode also extending into a rectangular region defined by said gate and data lines; and
    a pixel electrode formed over the structure and electrically connected to said source and drain electrodes, gate pad, and data pad, and wherein said pixel electrode is extended over a portion of said gate line as a capacitor electrode of a storage capacitor such that said storage capacitor includes said portion of said gate line, said extended portion of said pixel electrode, and said first insulating layer disposed inbetween.

2. The device of claim 1, wherein the device further comprises:
    a semiconductor layer and an ohmic contact layer being disposed between said first insulating layer and said source and drain electrodes.

3. The device of claim 2, wherein said pixel electrode is deposited within a back channel defined by said source and drain electrodes.

4. The device of claim 1, wherein a short preventing part is formed between said capacitor electrode and said gate line.

5. The device of claim 4, wherein said short preventing part includes portions of a second insulating layer, a semiconductor layer, an ohmic contact layer, and a passivation layer.

\* \* \* \* \*